United States Patent [19]

Romanenko et al.

[11] 3,798,894

[45] Mar. 26, 1974

[54] DRIVE, PREFERABLY FOR THE MOVABLE MEMBER OF VALVES

[76] Inventors: Nikolai Trofimovich Romanenko, Leninsky propekt, 88, korpus 1, kv. 57; Jury Filippovich Nikitin, ulitsa Arbat, 18/1, kv. 31, both of Moscow, U.S.S.R.

[22] Filed: Mar. 23, 1972

[21] Appl. No.: 237,564

Related U.S. Application Data

[63] Continuation of Ser. No. 93,958, Dec. 1, 1970, abandoned.

[30] Foreign Application Priority Data

Dec. 1, 1969 U.S.S.R. ............................. 1386183

[52] U.S. Cl. ..................... 60/23, 251/11, 251/68, 251/70
[51] Int. Cl. ............................................. F16k 31/02
[58] Field of Search ............ 60/23; 74/2; 251/11, 68, 251/69, 70

[56] References Cited
UNITED STATES PATENTS

| | | |
|---|---|---|
| 1,568,817 | 1/1926 | Falkenwalde ..................... 251/70 X |
| 2,118,443 | 5/1938 | McCorkle .......................... 251/11 |
| 2,353,350 | 7/1944 | Millerwise ............................. 60/23 |
| 3,080,143 | 3/1963 | Biermann et al. ................. 251/69 X |
| 3,108,616 | 10/1963 | Ray ................................... 251/11 X |
| 3,386,065 | 5/1968 | Algino .............................. 251/11 X |

Primary Examiner—William F. O'Dea
Assistant Examiner—Peter D. Ferguson
Attorney, Agent, or Firm—Holman & Stern

[57] ABSTRACT

A drive for the movable member of valves, in which an actuating element connected to a source of electric current for the purpose of its heating is mounted in a housing on two supports.

One of the supports is secured to the housing, with the other support being connected to the movable member of the valve, and being capable of displacement with a length variation of the heated actuating element, Mounted in the drive housing is an arrangement for fixing the actuating element in the extended position after its heating, and releasing the element after cooling, to execute the working stroke by the effect of elastic deformation.

2 Claims, 5 Drawing Figures

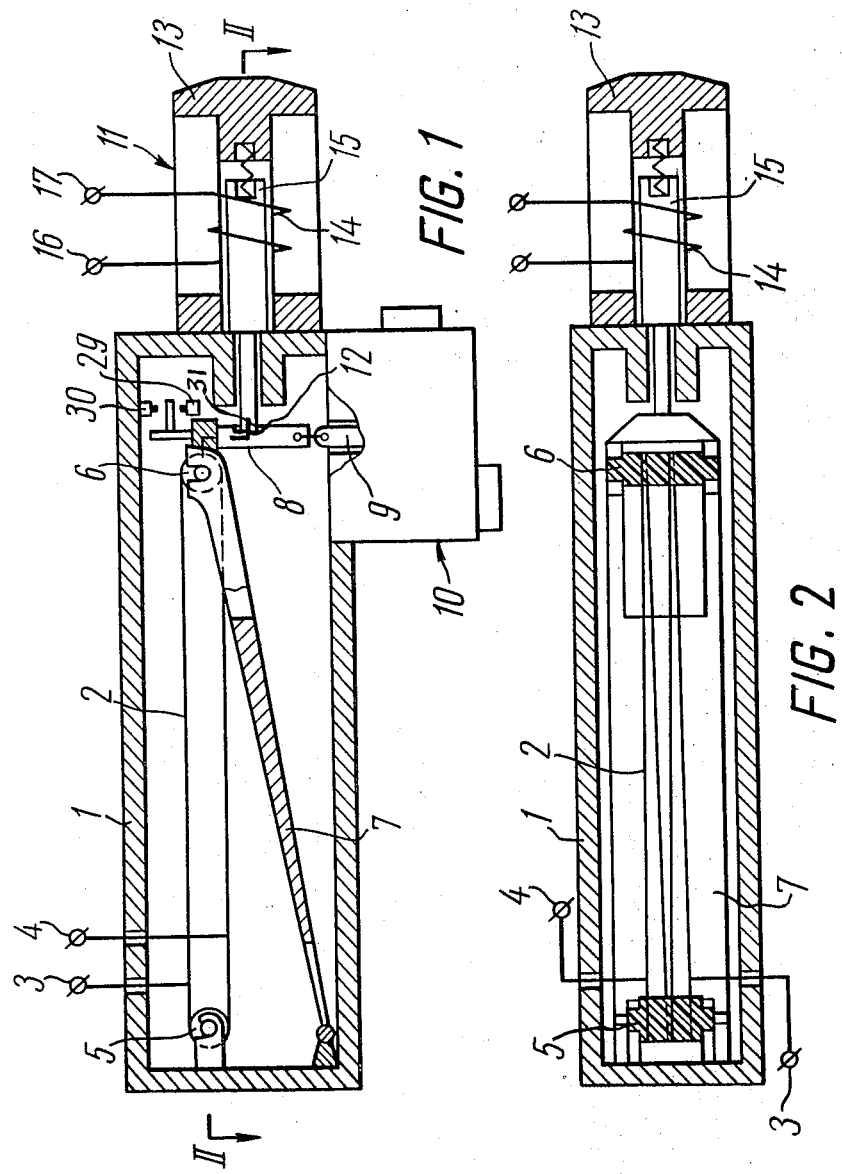

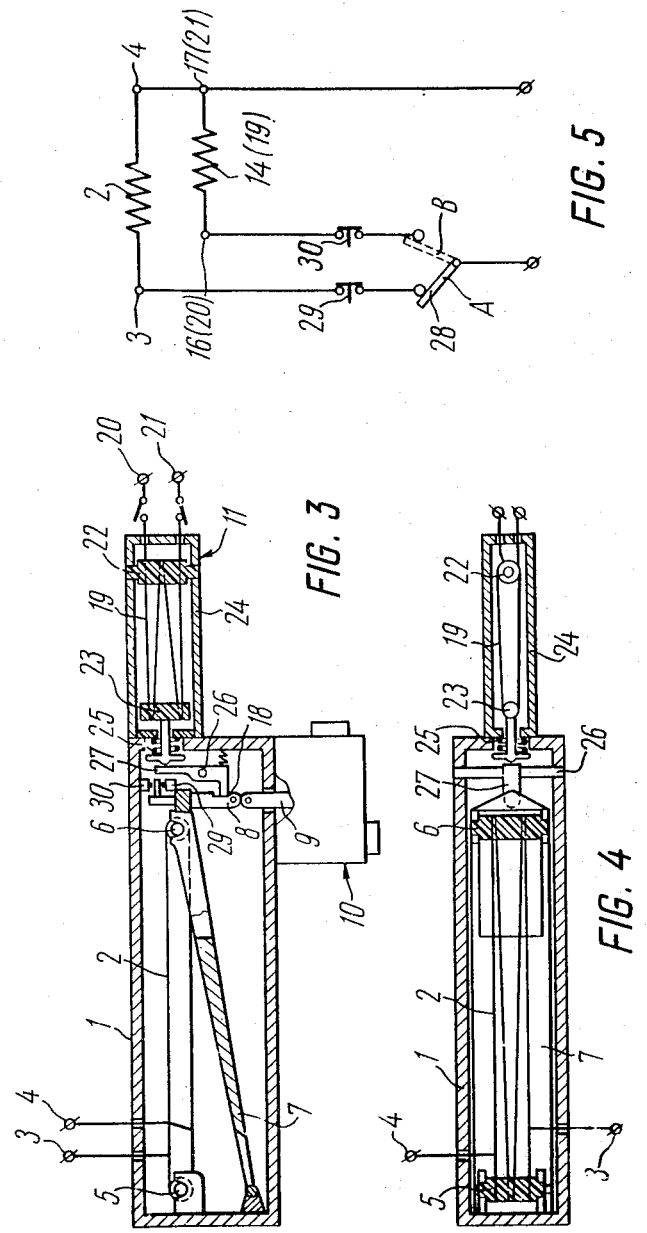

DRIVE, PREFERABLY FOR THE MOVABLE MEMBER OF VALVES

This is a continuation of application Ser. No. 93958, filed Dec. 1, 1970, now abandoned.

BACKGROUND OF THE INVENTION

The present invention relates to drives for displacing the movable members of locking members or valves.

The drive according to the present invention is preferably to be employed for a remote control of valves in pneumatic or hydraulic systems.

The most advantageous use of the drive can be made in the cases, when a high rate of movement of the working member must be secured in emergency protection system, in fire quenching, catapulting, etc.

Known in the art is a drive for displacing the movable member of valves, in the body of which there is mounted an actuating element consisting of a conductor connected to a source of electric current for its heating. The actuating element is mounted on two supports, with one of the supports fixed in the housing, the other support being spring loaded, and connected to the movable member of the valve. This support can move with a length variation of the heated actuating element (see, for example, an earlier U.S. Pat. Application No. 875,116, British Patent Application No. 53,653/69).

The above-described drive features a low rate of displacement of the movable member and the working stroke continues several seconds.

An object of the present invention is to eliminate the mentioned disadvantage.

The basic object of the invention is to provide a drive for displacing the movable member of valves, whereby the working stroke of the valve movable member is of much lesser duration than with the previous drives.

SUMMARY OF THE INVENTION

With this object in view, in a drive, preferably for the movable member of valves, comprising an actuating element connected, for its heating, to a source of electric current, and mounted in the drive housing on two supports, one of the supports being fixed in the housing, and the other support being linked to the valve movable member and capable of moving with a length variation of the heated actuating element, according to the invention, there is provided an arrangement for fixing the actuating element in the extended position after its heating, and releasing such element after cooling, to execute the working stroke by the effect of elastic deformation.

It is advantageous that the arrangement for firing the actuating element in the extended position comprise a stop mounted on the movable member of the valve, and an electric magnet located in the drive housing, with the core of the magnet interacting with the stop.

Such a solution permits achieving a very high rate of displacement of the movable support of the drive and the duration of the working stroke is reduced to hundredth fractions of a second.

It is no less advantageous, that the arrangement for fixing should the actuating element in the extended position should comprise a stop mounted on the movable member of the valve, and a conductor connected, for the heating of the element, to a source of electric current, with the conductor being mounted on two supports, one of the supports being fixed in the drive housing, and the other support being spring biased and interacts interacting with the stop.

Such a solution makes possible achieving a high rate of the drive action, and at the same time unifying the components of the fixing arrangement and the actuating element.

The drive for the movable member of valves according to the present invention features a high rate of action, which obtains a working stroke duration of within several hundredth fractions of a second.

Following is the description of a particular exemplary embodiment of the present invention with reference to the appended drawings.

BRIEF DESCRIPTION OF THE DRAWINGS

FIG. 1 shows the drive for the movable member of valves according to the invention, the view being partly in elevation and partly in longitudinal section (of a first embodiment of the arrangement to for fixing the actuating element in the extended position);

FIG. 2 is a view taken along line II—II in FIG. 1 the view looking in the direction of the arrows;

FIG. 3 shows the drive for the movable member of valves the view being partly in elevation and partly in longitudinal section (of a second version of the arrangement for fixing the actuating element in the extended position);

FIG. 4 is a view taken along line IV—IV in FIG. 3 the view looking in the direction of the arrows; and FIG. 5 is the electric connection diagram of the drive for the movable member of valves.

DETAILED DESCRIPTION OF THE INVENTION

Located in a housing 1 (FIGS. 1,2) of the drive is an actuating element 2 consisting of conductor turns which, are through terminals 3 and 4, are connected to a source of electric current (not shown).

The actuating element 2 is mounted on two supports 5 and 6 with the support 5 being fixed in the housing 1, while the support 6 is movable, and is connected with one end of an arm 7 whose other end is hinged to the housing 1.

The support 6 is connected to a movable member 8 and therethrough with a movable member 9 of a valve 10. The members 8 and 9 are linked to each other through a hinge, since the member 8 moves circumferentially, while the member 9 moves linearly.

Mounted on the housing 1 is an arrangement donated generally 11 for fixing the actuating element 2 in an extended position after its heating. This arrangement included a slot 12 placed on the movable member 8, and an electric magnet 13 provided with a coil 14 and a spring biased core 15.

A shoulder, or stop, 31 of slot 12 abuts against the core 15 after the actuating element 2 is heated, due to which the element 2 is fixed in the extended position. Terminals 16 and 17 connect the coil 14 with the source of electric current (not shown).

In a second embodiment of the arrangement 11, a stop 18 (FIGS 3, 4) is placed on the movable member 8, and a conductor 19 is connected, through terminals 20 and 21, to a source of electric current (not shown). The conductor 19 is mounted on supports 22 and 23. The support 22 is fixed in a housing 24 rigidly attached to the housing 1. Connected to the support 23 is a spring biased push rod 25 which reciprocates in guides provided in the housing 24. Mounted in the housing 1 on a pivot 26 is a spring loaded two-armed lever 27, with one arm thereof coacting with the stop 18, and the other arm with the push rod 25.

After the actuating element 2 is heated, the stop 18 abuts against the arm of the lever 27, so that the actuating element 2 is fixed in its extended position.

The drive for the movable member of valves in accordance with the first embodiment functions as follows:

As a switch 28 (FIG. 5) is moved into position A, current flows through an end switch 29, and the actuating element 2 connected into the electric circuit by way of terminals 3 and 4. The actuating element 2 is heated with the current, and thereby elongated, due to which elongation, the support 6 (FIGS 1, 2) and the movable members 8 and 9 connected therewith descends. When the slot 12 goes below the spring biased core 15, the core will move to the left.

The position taken at this time by the members 8 and 9 is a final one, since their stroke reached the specified length. At this moment, the end switch 29 mounted in the housing 1, and interacting with the movable member 8, is disconnected. As a result, the electric circuit is cut, and current supply is stopped, the actuating element starting to cool off.

As it does so, the shoulder 31 abuts against the core 15, with the actuating element 2 thus being fixed in the extended position. Further cooling of the actuating element with its length unchanged causes growth of mechanical stresses therein. After the cooling of the actuating element 2 is completed, the drive is prepared to perform the working stroke.

To execute the working stroke, switch 28 (FIG. 5) must be moved into position B. In this case, current flows through an end switch 30 fixed in the housing 1, and the coil 14 of the electric magnet 13. The coil is connected to the electric circuit through the terminals 16 and 17. As current flows in the coil 14, the core 15 drawn into the coil 14 thus moving to the right, and releasing the stop 13. The stop 13 having been freed, means the actuating element 2 is shortened by the internal stress, and performs the working stroke through elastic deformation, thus moving upwardly the support 6 and the movable members 8 and 9 of the valve. At the end of the working stroke, the end switch 30 interacting with the movable member 8 is disconnected, and the electric circuit is broken.

In the second embodiment the drive functions as follows:

The actuating element 2 is heated in the same way as in the first-described embodiment. Next, when the support 18 drops below the spring loaded lever 27, the lever turns clock-wise. The position taken at this moment by members 8 and 9 is final, i.e., their stroke has reached its specified length. Now, the end switch 29 mounted in the housing 1 and interacting with the movable member 8 is disconnected. The current supply is stopped. The actuating element 2 starts to cool. The stop 18 now abuts against one arm of the lever 27, and the actuating element 2 is thus fixed in its extended position. Further cooling of the actuating element 2 with its length unchanged causes growth of mechanical stresses therein. After the cooling of the actuating element 2 is completed, the drive is prepared to perform the working stroke.

To execute the working stroke the switch 28 (FIG. 5) should be moved into position B. In this case, current flows through the end switch 30 and conductor 19 connected into the electric circuit by way of the terminals 20 and 21. As current passes through conductor 19, the conductor is heated and elongated, whereby the support 23 and the spring biased push rod 25 move to the left. The push rod 25 turns the lever 27 and the said one arm of the lever releases stop 18. Once stop 18 is free, the actuating element 2 shortens, involving the working stroke as described in connection with the first embodiment.

The drive made according to the present invention can be employed not only for displacing the movable member of valves, but also for acctuating heat regulation louvres, electric contactors, etc. The present drive is simple to produce, reliable in operation, and operable with both a.c. or d.c. currents.

In addition, the duration of the working stroke with such a drive can be reduced to 0.03 seconds and less.

What we claim is:

1. A drive, preferably for a movable member of a valve, comprising: a housing for the drive; an actuating element having two supports one of which is mounted on said housing and the other support is adapted to be mounted on a movable member of a valve, said actuating element extending upon heating, means connecting said element for its heating to a source of electric current; said other support being movable upon extension of said actuating element; means for retaining said actuating element in the most extended position after its heating, and means for releasing said element after cooling, to execute a working stroke by the effect of elastic deformation caused by said cooling, said retaining means being movably mounted in said housing, said retaining means comprising a stop abutment adapted to be connected to the movable member of the valve and a spring biased core of an electromagnet cooperating with said abutment when said electromagnet is not energized.

2. A drive, preferably for a movably member of a valve, comprising : a housing for the drive; an actuating element having two supports one of which is mounted on said housing and the other support is adapted to be mounted on a movable member of a valve, said actuating element extending upon heating, means connecting said element for its heating to a source of electric current; said other support being movable upon extension of said actuating element; means for retaining said actuating element in the most extended position after its heating, and means for releasing said element after cooling, to execute a working stroke by the effect of elastic deformation caused by said cooling, said retaining means being movably mounted in said housing, said retaining means comprising a stop abutment adapted to be connected to the movable member of the valve, and a conductor which extends upon heating connected, for its heating, to a source of electric current, said conductor being mounted on two supports, one of said supports being spring biased to cooperate with stop abutment when said conductor is not heated.

* * * * *